United States Patent [19]

Gammel et al.

[11] Patent Number: 5,153,430
[45] Date of Patent: Oct. 6, 1992

[54] METHOD AND APPARATUS FOR MEASURING THE MOMENTUM, ENERGY, POWER, AND POWER DENSITY PROFILE OF INTENSE PARTICLE BEAMS

[75] Inventors: George M. Gammel, Merrick, N.Y.; Henry W. Kugel, Somerset, N.J.

[73] Assignee: The United States of America as represented by the United States Department of Energy, Washington, D.C.

[21] Appl. No.: 767,604

[22] Filed: Sep. 30, 1991

[51] Int. Cl.$^5$ ............................................. H01J 47/00
[52] U.S. Cl. ................... 250/251; 250/305; 324/71.3; 324/71.4
[58] Field of Search ............... 250/251, 305; 324/71.3, 324/71.4

[56] References Cited

U.S. PATENT DOCUMENTS 4,801,205 1/1989 Tatsuno .
4,854,705 8/1989 Bachalo .

OTHER PUBLICATIONS

Lockhart et al., The Review of Scientific Instruments, vol. 42, No. 3, Mar. 1971, pp. 315–318.
Shiloh et al., The Review of Scientific Instruments, vol. 54, No. 1, Jan. 1983.
U.S. Statutory Invention Registration No. H235, Kugel et al., published Mar. 3, 1987.

*Primary Examiner*—Jack I. Berman
*Attorney, Agent, or Firm*—Helen S. Cordell; John M. Albrecht; William R. Moser

[57] ABSTRACT

A method and apparatus for determining the power, momentum, energy, and power density profile of high momentum mass flow. Small probe projectiles of appropriate size, shape and composition are propelled through an intense particle beam at equal intervals along an axis perpendicular to the beam direction. Probe projectiles are deflected by collisions with beam particles. The net beam-induced deflection of each projectile is measured after it passes through the intense particle beam into an array of suitable detectors.

20 Claims, 2 Drawing Sheets $$P_{NEUT} = \int_{Y_i}^{Y_N} P_i$$

METHOD AND APPARATUS FOR MEASURING THE MOMENTUM, ENERGY, POWER, AND POWER DENSITY PROFILE OF INTENSE PARTICLE BEAMS

CONTRACTUAL ORIGIN OF THE INVENTION

The United States Government has rights in this invention pursuant to Contract No. DE-AC02-76CH03073 between the U.S. Department of Energy and Princeton University.

BACKGROUND OF THE INVENTION

This invention relates to measurement of the power of high momentum mass flow, to measurement of the energy of particle beams, and in particular to measurement of the momentum, energy, power and power density profile of intense neutral beams used in heating a fusion plasma.

High energy particle beams are widely used in science and industry. In typical applications, beams are first accelerated to a desired energy, and are then used to analyze or modify various targets. For example, in nuclear research particle beams are used to analyze the basic physical properties of subatomic systems, and in solid state physics research particle beams are used to study the physical properties of surfaces, crystals and thin films. Beams are also used to modify targets, as in the commercial production of radio-pharmaceuticals and ion-implanted semiconductor devices.

The measurement of the energy of intense particle beams can involve considerable difficulties. In the prior art, calorimetric methods are often used to measure the energy of moderately intense particle beams. These methods require stopping the beam in a suitable media and observing the media's subsequent temperature rise as beam kinetic energy is converted into thermal energy. For moderately intense beams, water cooling is used to return calorimeters to their initial states between pulses.

In a number of research efforts leading to the development of nuclear fusion as a long-term energy source, intense, large area, pulsed, neutral beams are used to heat fusion reactor plasmas. It is estimated that the next generation of fusion reactors will require particle beams with injection powers of 30–100 MW at particle energies of 100–200 keV and pulse lengths of 10–100 s. Prior art calorimetric methods are unsuitable for measuring beams at these power densities. For a 500 msec beam pulse, a copper calorimeter is typically limited to power densities of 3 kW/cm$^2$ so as not to exceed the surface melting temperature. It is possible to measure higher power densities by inclining the angle of the calorimeter with respect to the beam from 90 degrees to as little as 12 degrees, thereby reducing the effective surface power density by about a factor of 4.8. However, this is the practical limit for this technique due to geometrical limitations and the unacceptable amount of power that is forward scattered at near grazing incidence.

Active cooling techniques can be used in the measurement of incident power densities approaching 10–20 kW/cm$^2$ for 500 ms pulse lengths, but these techniques cannot be used with significantly higher beam intensities.

In addition, achievement of necessary beam powers requires the use of several ion sources to inject multiple beam lines through adjacent ports, which necessitates precise determination of power density in both time and location. The non-steady state of the temperature field arising in a calorimetric body, as well as space limitations, suggest that it is not possible to use calorimeters as permanent instrumentation for this task.

It is therefore a primary object of this invention to provide a method for measuring energy of particle beams whose intensity prevents use of techniques currently in practice.

In the accomplishment of the foregoing object, it is another important object of this invention to provide a method for measuring the power of a high intensity particle beam which can be performed in a nonperturbative manner, that is, without impeding or completely stopping the beam flow.

It is another important object of this invention to provide a method which enables precise determination of the power density of a high intensity particle beam in both time and location.

It is a further object of this invention to present an apparatus which is simple, compact and for which installation and maintenance are easier when compared with apparatus presently in use, resulting in considerable savings in material, labor and cost for large high power particle beam systems.

Additional objects, advantages and novel features of the invention will become apparent to those skilled in the art upon examination of the following and by practice of the invention.

SUMMARY OF THE INVENTION

To achieve the foregoing and other objects, this invention comprises a method and apparatus for determining the power, momentum, energy, and power density profile of high momentum mass flow. Small probe projectiles of appropriate size, shape and composition are propelled through an intense particle beam at equal intervals along an axis perpendicular to the beam direction. Probe projectiles are deflected by collisions with beam particles. The net beam-induced deflection of each projectile is measured after it passes through the intense particle beam into an array of suitable detectors. The intercepted beam momentum, energy, and power along a particular slice through the particle beam can be deduced from the measured deflection. Analysis of a sufficient number of sampled slices yields the beam power density distribution.

BRIEF DESCRIPTION OF THE DRAWINGS

The present invention is illustrated in the accompanying drawings where.

DETAILED DESCRIPTION OF THE INVENTION

Figure 1:
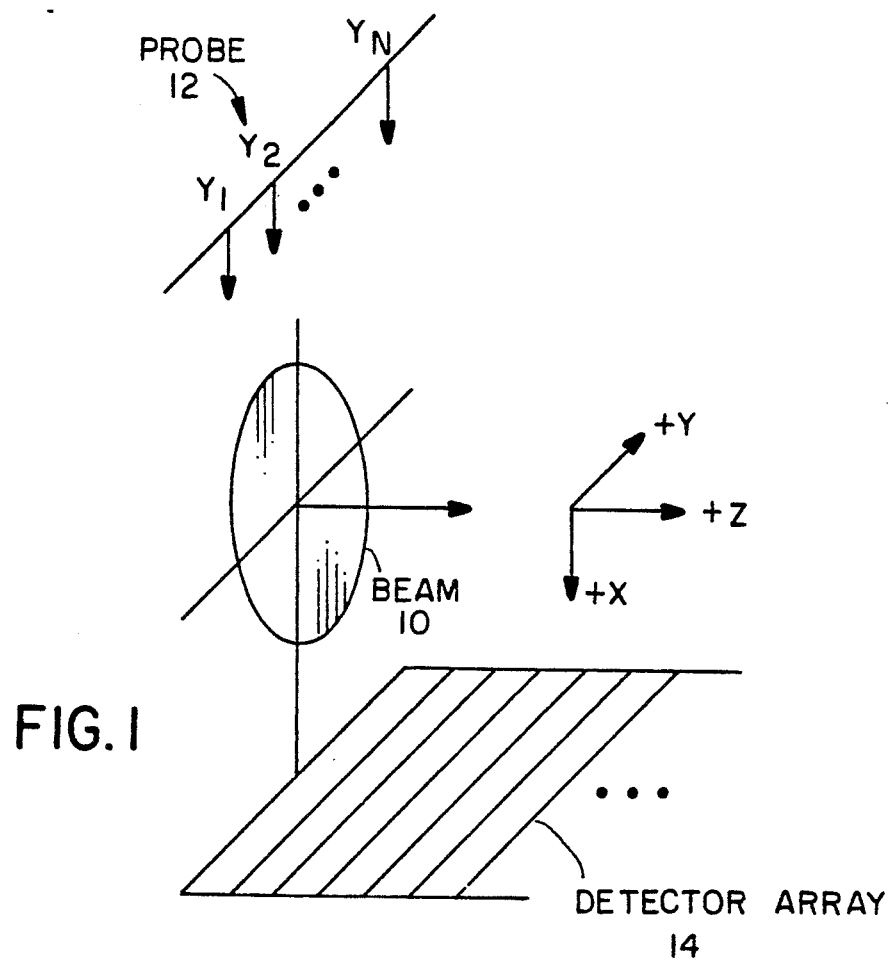
FIG. 1 is a schematic drawing depicting the apparatus of the present invention.

FIG. 1 a schematic drawing depicting the apparatus of the present invention. A total of N probes (collectively designated probe 12) are dropped vertically through a horizontally moving beam 10. The first probe 12 is dropped from position $y_1$, the second from position $y_2$, etc., and finally the Nth probe 12 is dropped from position $y_n$. As a probe passes through beam 10 it is deflected in the +z direction, and is then detected as it passes through detector array 14.

When a beam particle (mass m, velocity $v_b$) collides with a probe (mass M, radius R) the velocity of the probe changes in the z-direction ($\delta v_z$). In the case of a total inelastic collision (the beam particle imbeds itself into the probe), the change in velocity will be $\delta v_z = (m/M) v_b$. A negligible number of beam particles, about 1 in $10^6$, will be elastically backscattered from the surface of the probe as described by the Rutherford Scattering cross section, known to the prior art.

Figure 2:
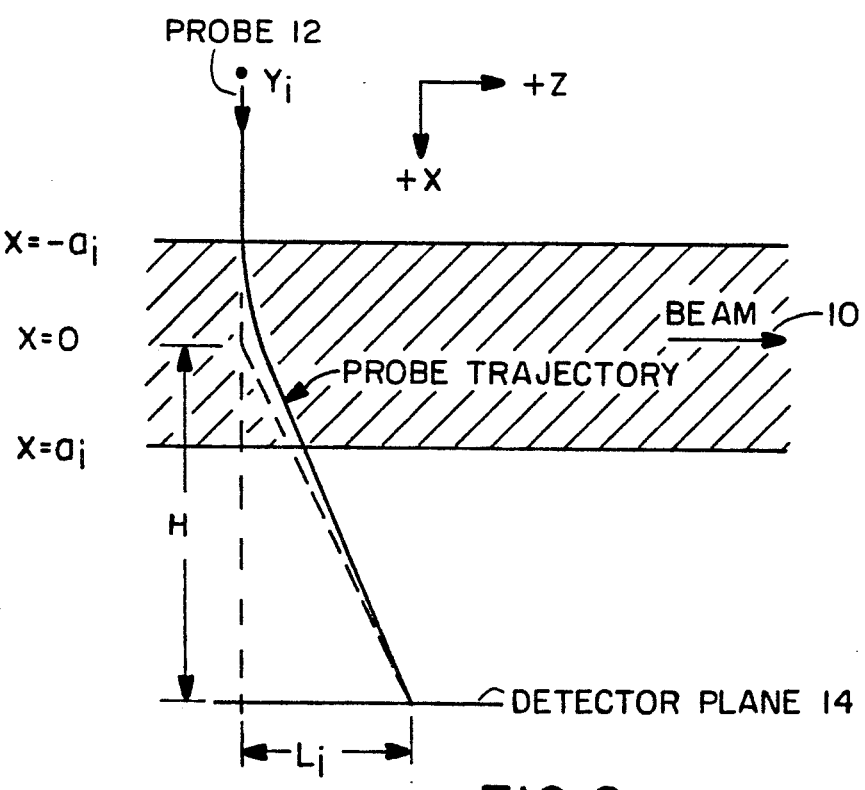
FIG. 2 is a schematic drawing depicting the deflection of a probe projectile as it passes through a slice of a beam and the resultant trajectory of the deflected projectile.

Referring to FIG. 2, consider the trajectory of the $i^{th}$ probe 12 as it is dropped from position $y_i$ and traverses beam 10' from $x = -a_i$ to $x + a_i$. For each collision between probe 12' and a beam particle, this invention makes the following simplifying assumptions:
that beam 10' is monoatomic,
that $v_x$ is approximately constant,
that collisions are inelastic [$\delta v_z = (m/M) v_b$],
that the z-directed probe velocity at $x = a_i < < v_b$, and
that $m < < M$.

On skilled in the art will recognize that if collisions were elastic, as would be the case for probes dropped through a charged beam (the probe would charge up until all beam particles were elastically scattered), then $\delta v_z = (2m/M) v_b$.

Preliminary to determining the power, or energy per unit time, of the particle beam, this invention then defines the number of collisions during a given time interval $\delta t$. The cross-sectional area of the probe 12' is A, which equals $\pi R^2$. Let C equal the number of collisions between probe 12' and beam particles in time $\delta t$. Then $$C = n(x) v_b A \delta t$$

If $\delta x = v_x \delta t$, then $$C = n(x) v_b (\delta x / v_x) A$$

For a slice of the beam 10' which extends from $-a_i$ to $a_i$ at position $y_i$, the total number of collisions $N_i$ on probe 12' as it drops through beam 10' is $$N_i = \int_{-a_i}^{+a_i} C = (v_b/v_x) A \int_{-a_i}^{+a_i} n(x) \partial x.$$

The final velocity picked up by probe 12' ($\delta v_{z,i}$) will then be $N_i \delta v_z$, or the number of collisions times the change in velocity per collision.

Referring to FIG. 2, $L_i$ is the displacement in the z-direction of probe 12' in detector plane 14', and H is the distance in the x-direction from the center of beam 10' to detector plane 14'. From FIG. 2, $L_i$ is to H as $\Delta v_{z,i}$ is to $v_x$, i.e.

$$(L_i/H) v_x = \Delta v_{z,i} = N_i \delta v_z$$

substituting the expression for $N_i$, we have the equation:

$$(L_i/H) v_x = \left[ (v_b/v_x) A \int_{-a_i}^{+a_i} n(x) \partial x \right] \partial v_z \quad (1)$$

From this equation, $\int_{-a_i}^{+a_i} n(x) \partial x$ can be found, since all other quantities are known.

If $E_b$ is the energy of a single beam particle, the power, $P_i$, flowing through a slice of the beam of width $\delta y$ at position $y_i$ is:

$$P_i = \left[ \left( \int_{-a_i}^{+a_i} n(x) v_b \partial x \right) \partial y \right] E_b$$

$$= \left( \int_{-a_i}^{+a_i} n(x) \partial x \right) \partial y v_b E_b$$

As just described, $n(x) \delta x$ is known; therefore $P_i$ is known. The total neutral power, $P_{neut}$, then, is $$P_{neut} = \Sigma P_i = \int_{y_i}^{y_n} P_i = v_b E_b \int_{y_i}^{y_n} \int_{-a_i}^{+a_i} n(x) \partial x \partial y$$

Figure 3:
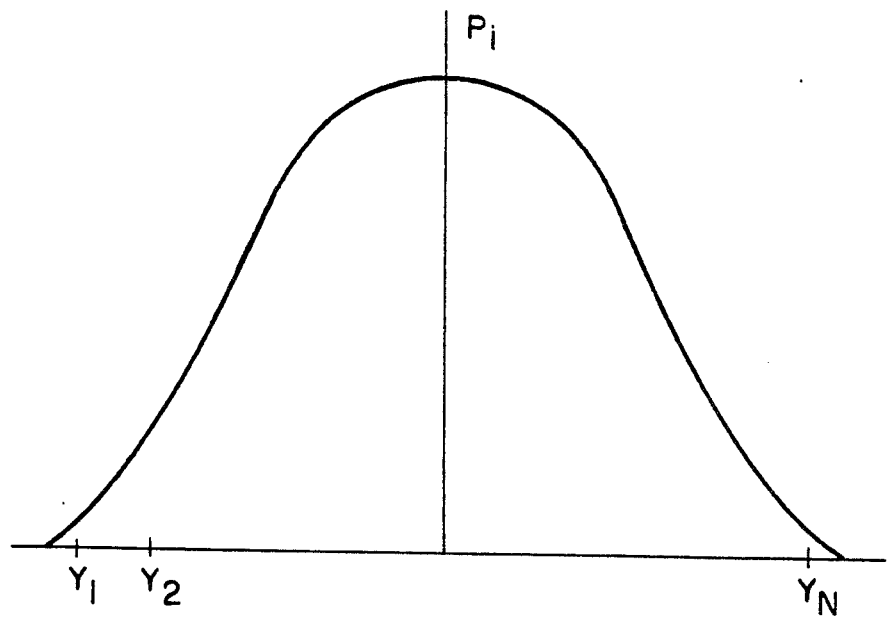
FIG. 3 is a graph illustrating a typical beam power density profile from measurements of the power flowing through a number of sampled slices.

FIG. 3 is a graph illustrating a typical beam power density profile from measurements of the power flowing through a number of sampled slices. $P_{neut}$ is the area under the curve.

In one embodiment, a stainless steel sphere with a radius (R) of 2 mm and mass (M) of 0.33 gm is projected at constant velocity ($v_x$) of 3 m/s so as to traverse perpendicularly through the path of a deuterium neutral beam having a cross-sectional area ($A_b$) of 400 cm$^2$ and a velocity ($v_b$) of $3.1 \times 10^6$ m/s (100 keV). All beam particles are assumed to be at full energy. A detector array is placed in a plane which is 1.5 m (distance H) from the center of the beam, and it is experimentally determined that upon collision with a particle in the beam, the sphere is deflected a distance (L) of 10 cm in the plane of the detector array. Using the above equations and solving for $P_{neut}$ gives $P_{neut}$ is approximately 2.5 megawatts.

A constraint on $v_x$ is that the probe (in the preferred embodiment, a stainless steel sphere) must be moving fast enough that it will not achieve surface melting temperatures as it traverses the beam. The total energy absorbed by the $i^{th}$ sphere is $N_i(mv_b^2/2)$, hence, $$N_i(mv_b^2/2) = M c_p \Delta T,$$

where $c_p$ is the specific heat capacity of the sphere. For the stainless steel sphere, $c_p$ is 320 J/Kg-° K. With $v_x = 3$ m/s, $\Delta T$ is 720 deg C. Therefore, the sphere will not vaporize while traversing the beam.

If, as shown in FIG. 2, probe 12' is dropped vertically through horizontally moving beam 10', then position $y_i$ must be high enough so that $v_x$ is approximately constant as the probe falls from $x = -a_i$ to $x = +a_i$. In the above embodiment, if the sphere is dropped from rest it would be traveling at 4.4 m/s after dropping 1 m.

In an alternate embodiment, if $v_x = gt$, where g is acceleration due to gravity, n(x) is constant, and $t_i$ is the time it takes for the sphere to drop through a beam, $$2a_i = v_0 t_i + g t_i^2/2$$

and $$N_i = n v_b A t_i$$

The equation $(L_i/H)v_x = N_i \delta v_z$ then becomes an equation for finding n. Once n is known, $P_i = (n v_b 2 a_i \delta y) E_b$ can be found, and the total neutral power is $$\int_{y_i}^{y_n} P_i$$

as in the embodiment above.

Figure 4:
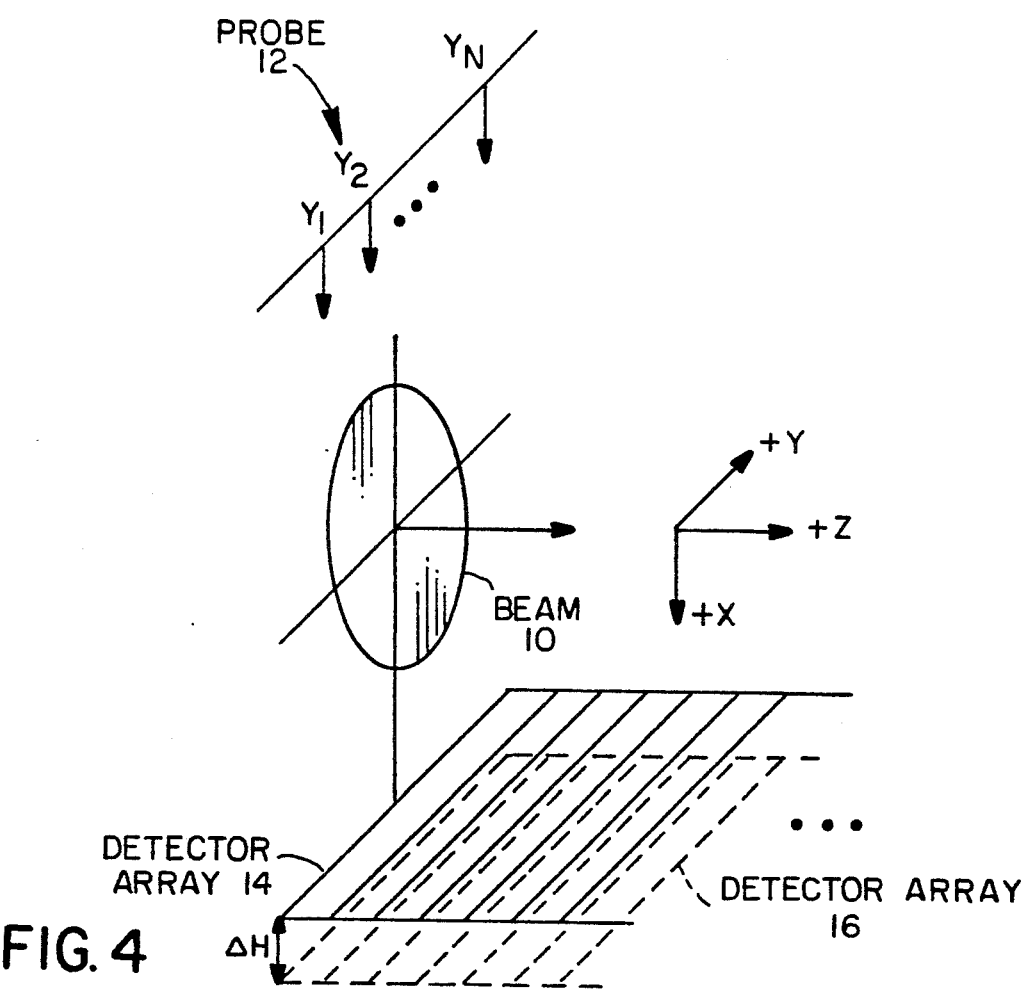
FIG. 4 is a schematic drawing depicting an alternate embodiment of the apparatus of the present invention.

In a further embodiment, the measurement of $\Delta v_z$ can be improved as shown in FIG. 4 by adding second detector array 16 a distance $\Delta H$ below the plane of detector array 14. If probe 12 is detected at detector array 14 as $(z_1, t_1)$ and at detector array 16 as $(z_2, t_2)$, where $\Delta H = Z_2 - z_1$, then $$\Delta v_z = (z_2 - z_1)/(t_2 - t_1).$$

Those skilled in the art will recognize that a number of alternate detector arrays may be used depending on the applicable technical and economic constraints. Following are among the possible arrays:

a) An appropriate photographic camera with superimposed fiducial marks can be used separately or in conjunction with a facilitating optical system to record accurate position measurements. Analysis of the resulting photographs can yield the deflected positions.

b) A photographic emulsion or etchable track detector (for example, as is used for nuclear particle detection) can be used to record the deflected probe position. A manual analysis or commercially available processing equipment can be used to obtain the final deflected position from the recording medium.

c) A suitable video camera with electronically superimposed fiducial marks can be used to yield accurate position measurements. The resulting video image can be analyzed visually to yield the deflected positions, or, using commercially available equipment, the entire measurement and analysis process can be automated by directly digitizing the video image, and performing the analysis using an automatic data processing system. This approach has the advantage of yielding all quantities of interest in a prompt and efficient manner conducive to using the results to quickly tune or optimize a particle beam system.

d) An interrupted photon beam (e.g. infrared, visible, uv, etc.) together with a photon detector suitable for the particular wavelength employed could be used to detect the defleted positions. The resulting signals can be processed manually or using automatic data processing equipment as described in item c) above.

e) An interrupted electron beam can be used together with an electron detector suitable for the electron energy employed. The resulting signals can be processed manually or using automatic data processing equipment as described in item c) above.

f) A vibration or impact (phonon) detector array can be used. The type of detector would depend on the mass and velocity of the probe projectile. In some applications, for example, a piezoelectric sensor array could be used to detect impact-induced compression. The resulting signals from this or other detector types can be processed manually or using automatic data processing equipment as described in item c) above.

g) An impacted diaphragm or reed detecting motion can be used to determine the impact position. If the detection device provided an electrical output signal the resulting signals can be processed manually or using automatic data processing equipment as described in item c) above.

h) If a charged particle beam is being measured, the incident charged particles would cause the probe particle to become charged. If the probe particle is electrically charged, its impact on a Faraday cup array will induce an electrical current and provide a signal indicating impact which can be used to detect the deflected position. The resulting signals can be processed manually or using automatic data processing equipment as described in item c) above.

i) The final probe position can also be measured by magnetic induction. If a metallic object passes rapidly through an induction coil connected in an appropriate current carrying circuit, the impedance of the coil will change, and the resulting change in an electrical signal from the circuit is an indicator of the event.

The method of the present invention is applicable not just to neutral beams. It is applicable to particle beams both neutral and charged, to gas and plasma jets, to liquids, colloids, and slurries, and in general, to measuring the momentum, energy, power, power density, and flow rates of any high power, high flow, high velocity fluid and particle beam capable of deflecting a suitable probe particle to an appropriate detector. This technique allows these measurements to be extended to significantly higher beam and fluid flow intensities in a non-perturbative manner.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. An apparatus for measuring the energy of an intense particle beam comprising:
    means for generating an intense particle beam,
    means for causing a plurality of probe projectiles to enter the path of said particle beam at constant velocity and on paths perpendicular to the path of said particle beam, and
    means for determining the trajectories of said probe projectiles after said projectiles have collided with particles within said particle beam.

2. The apparatus of claim 1 wherein said particle beam is comprised of neutral particles.

3. The apparatus of claim 1 wherein said particle beam is comprised of charged particles.

4. The apparatus of claim 1 wherein said particle beam has intensity above 100 kW.

5. The apparatus of claim 1 wherein said particle beam is pulsed.

6. The apparatus of claim 1 wherein said particle beam is continuous.

7. The apparatus of claim 1 wherein said projectiles are metal spheres.

8. The apparatus of claim 7 wherein the path of said particle beam is horizontal and said means for causing said projectiles to traverse the path of said particle beam includes means for dropping said projectiles vertically.

9. The apparatus of claim 7 wherein the path of said particle beam is vertical and said means for causing projectiles to traverse the path of said particle beam includes means for propelling said projectiles horizontally.

10. The apparatus of claim 1 wherein said means for determining the trajectories of said projectiles includes a single detector array.

11. The apparatus of claim 1 wherein said means for determining the trajectories of said projectiles includes a plurality of detector arrays.

12. The apparatus of claim 1 wherein said means for determining the trajectories of said projectiles includes a grid of laser beams.

13. The apparatus of claim 1 wherein said means for determining the trajectories of said projectiles includes a sensor array for detecting scattered photons or electrons.

14. The apparatus of claim 1 wherein said means for determining the trajectories of said projectiles includes a phonon detector array for detecting vibration or impact.

15. The apparatus of claim 1 wherein said means for determining the trajectories of said projectiles includes a piezoelectric sensor for detecting impact-induced compression.

16. The apparatus of claim 1 wherein said means for determining the trajectories of said projectiles includes a diaphragm array for detecting motion.

17. The apparatus of claim 1 wherein said means for determining the trajectories of said projectiles includes a Faraday Cup array.

18. The apparatus of claim 1 wherein said means for determining the trajectories of said projectiles includes means for detecting magnetic induction.

19. The apparatus of claim 1 wherein said means for determining the trajectories of said projectiles includes a photographic emulsion.

20. A method for measuring the energy of intense particle beams comprising:
   generating an intense particle beam,
   causing a plurality of probe projectiles to enter the path of said particle beam at constant velocity and on paths perpendicular to the path of said particle beam, and
   determining the trajectories of said probe projectiles after said projectiles have collided with particles within said particle beam.

* * * * *